Nov. 13, 1962 W. R. EPPERLY ET AL 3,063,934
REMOVAL OF AROMATICS, OLEFINS AND SULFUR FROM NAPHTHA FEED
Filed April 10, 1959
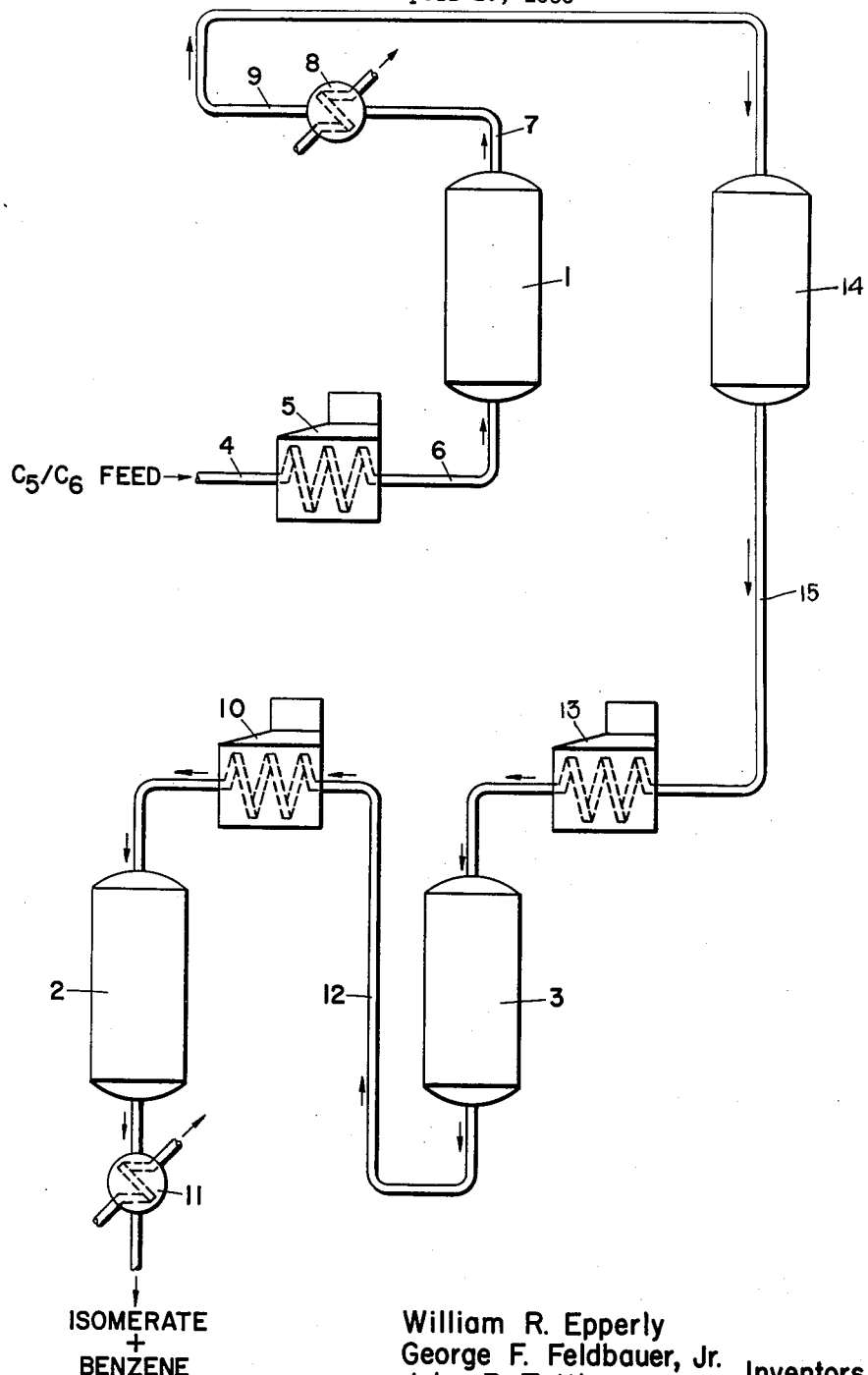
William R. Epperly
George F. Feldbauer, Jr.
John R. Tuttle
Charles W. Tyson
Inventors
By Richard W. Nagel Attorney

United States Patent Office 3,063,934
Patented Nov. 13, 1962

3,063,934
REMOVAL OF AROMATICS, OLEFINS AND SULFUR FROM NAPHTHA FEED
William R. Epperly, Roselle, John R. Tuttle, Summit, George F. Feldbauer, Jr., Cranford, and Charles W. Tyson, Summit, N.J., assignors to Esso Research and Engineering Company, a corporation of Delaware
Filed Apr. 10, 1959, Ser. No. 805,531
14 Claims. (Cl. 208—91)

The present invention relates to the preparation of feed for isomerization and paraffin alkylation. More particularly, it relates to a new and useful process for removing from the feed certain hydrocarbons which are detrimental to the catalysts used in isomerization and paraffin alkylation. Even more particularly, the invention relates to the removal of benzene, olefins, and sulfur compounds from the feed streams by adsorption with a molecular sieve, and utilizing the isomerate to desorb or purge the sieve.

With the modern trend to the use of higher compression ratios in automotive engines there has been an increasing demand for motor fuels of higher octane rating. One of the processes employed for improving the octane quality of naphthas that are blended into gasoline involves subjection of a fraction comprising normal paraffin hydrocarbons to a catalytic isomerization reaction wherein conversion to branched chain hydrocarbons takes place. The isomerization of normal paraffins to isoparaffins in the presence of a Friedel-Crafts type catalyst, of which aluminum bromide is an example, and in the presence of promotional amounts of halogen-containing promoters, of which hydrogen chloride is a typical example, is old. Numerous processes have been devised, both vapor phase and liquid phase, for the isomerization of normal paraffins to the corresponding isoparaffins.

When the light naptha being isomerized contains appreciable amounts of benzene, olefins and/or sulfur, the efficiency of the isomerization reaction is seriously impaired. The presence of benzene in the feed to the isomerization reaction in quantities greater than about .02 volume percent is injurious when the highly active aluminum bromide catalyst is employed. To ensure that the isomerization reaction will not be retarded, it is necessary to remove these aromatic and olfinic hydrocarbons and sulfur or substantially reduce their concentration in the feed stream. In addition the presence of benzene interferes with the separation of heavy naphthenic bottoms by fractionation. This may be a desirable step in preparing the light naptha as an isomerization feed. The benzene, which has a normal boiling point of 176° F., forms low boiling azeotropes with normal hexane and naphthenes such as methyl cyclopentane and cyclohexane. Efficient separation of the naphthenes and benzene from the paraffinic compounds is impossible because of the azeotropes which tend to come overhead with the desirable paraffinic compounds. These azeotropes boil in the same range as does normal hexane in a light naphtha cut, i.e. 150° to 160° F. Once the benzene is removed, this separation becomes simple. The separation of aromatics can be done by such methods as solvent extraction, extractive distillation, and low pressure hydrogenation using a catalyst such as palladium. Operations of this type are costly, however, and the need for better methods for removing aromatics has continued to exist. The presence of olefins is highly undesirable in feeds for an isomerization process using aluminum bromide catalyst, since the olefins react with the aluminum bromide to form sludge compounds. This reaction consumes costly aluminum bromide. The sludge and any sulfur present also fouls and deactivates the catalyst support and is highly corrosive.

Known natural adsorbents such as silica gel have proven ineffective in preparing feed for aluminum bromide isomerization. This is because their selectivity for aromatics, olefins, and sulfur is not as great as the synthetic sieves.

Broadly, it is the principal object of the present invention to provide a more efficient method for removing benzene, related aromatic hydrocarbons, olefins and sulfur from the feed to a naptha isomerization reactor as well as to upgrade low octane normal and isoparaffins to high octane branched chain paraffins.

Aromatics, olefins and sulfur are removed from the isomerization feed by contacting the feed with an adsorbent material selective to aromatic and olefinic hydrocarbons and sulfur, e.g. a 13X molecular sieve. The effectiveness of the molecular sieves is directly dependent on the excellence of the desorption. The development of aluminum bromide isomerization and paraffin alkylation has necessitated the removal of essentially all of the benzene from feed stocks. In the case of aluminum chloride isomerization, it is sufficient to reduce the benzene in the feed to less than 1%; while in the case of aluminum bromide isomerization it is necessary to reduce the benzene in the feed to less than .02%. To obtain less than 1% of benzene the saturated molecular sieve may be desorbed by heating, vacuum desorption and cooling. However, this desorption cycle is not adequate to reduce the benzene to the target level needed for aluminum bromide isomerization.

In accordance with the present invention, it has been found that the saturated molecular sieves can be effectively desorbed by utilizing part or all of the effluent from the isomerization reaction. This isomerate is used to heat, purge and cool the sieve in an economical and highly efficient manner.

The nature of this invention will be more fully understood when reference is made to the accompanying drawing.

Zone 1 illustrates the adsorption stage of the process. Zones 2 and 3 show the heating and purging and the cooling stages of the process. Three contacting zones 1, 2 and 3 are shown in the adsorption, heat-purge, and cooling stages of the cycle respectively. In the operation of the invention, each of the three contacting zones passes successively, starting at stage 1, through the three stages. After the sieve is cooled in stage 3 it may be used to repeat the cycle. In the actual operation of the apparatus and process the contacting zones remain in fixed positions and a manifold is utilized to control the input and exit gases to and from each zone. For simplicity, however, the apparatus and process will be described as though each sieve case is physically transported from one stage to the next.

Turning to Zone 1, hydrocarbon feed, containing aromatics, olefins and/or sulfur, is introduced through line 4 into furnace 5 wherein it is vaporized and preheated to about 250° F. It should be noted that though the feed to the sieve case or adsorption is generally in the vapor state, in some situations it may be advantageous to carry out the adsorption step under mixed phase or liquid phase conditions. This preheated feed enters contacting zone 1 thru line 6 and is stripped of aromatics by a fresh 13X molecular sieve. The aromatic-free hydrocarbon sievate leaves through line 7, is cooled in condenser 8, and passes to the isomerization reactor 14 through line 9.

At or just before breakthrough, i.e., the time when aromatics are no longer adsorbed in sieve case 1 to the desired extent, the adsorption step terminates and the heat-purge stage commences. The occurrence of breakthrough may be established by observing the refractive index or ultraviolet absorption of the effluent stream. At breakthrough the refractive index increases abruptly. Breakthrough may also be determined from temperature measurements within the sieve bed. The zone where adsorption is taking place has a higher temperature than the rest of the bed, or a so-called "temperature peak." When this temperature peak nears the exit end of the bed, breakthrough is imminent.

In the heat-purge stage, represented by contacting zone 2, hot isomerate vapors are employed. The subsequent cooling stage is shown in zone 3. The isomerate vapors from an isomerization reactor 14 are heated to a temperature of about 650° F. by passing them successively through line 15 and furnace 13, the hot contacting zone 3 and furnace 10. Upon entering contacting zone 2 the hot isomerate vapor serves a dual function. Firstly, the molecular sieve in contacting zone 2 is heated to about 650° F.; and secondly, the aromatics adsorbed on the sieve are purged. The hot isomerate vapors now containing the aromatic desorbate, i.e., the material adsorbed during the adsorption step, leave contacting zone 2, and are cooled in condenser 11. This mixture may be used as a high grade gasoline. After the purging is complete, the molecular sieve is cooled in contacting zone 3 by passing through it cool isomerate, i.e., isomerate heated to 250° F. in furnace 13. It should be noted that the isomerate for cooling enters the contacting zone in the same direction as the isomerate purge, and, in each case, the flow is countercurrent to that used in adsorption. This procedure is advantageous because any residual adsorbate, i.e., aromatics or olefins, that remains in the lower part of the sieve may be removed by the isomerate in contacting zone 3. By the time the isomerate reaches the lower part of zone 3 it is sufficiently heated to act as a clean-up. In this third stage, the contacting zone 3 is cooled to about 250° F., a temperature suitable for a subsequent adsorption stage. The isomerate leaves contacting zone 3 through line 12 and passes to the heating and purging stage as described above.

Many modifications of the above described process can be made within the scope of the present invention. For instance, the cooling gas may be passed through the contacting zone in the same direction as the feed. Running the isomerate through the molecular sieve in the cooling stage, of course, initially cools the inlet end of the sieve; this cool part of the sieve acts to strip any residual aromatics, olefins and sulfur from the isomerate. This very clean isomerate, as it passes to the outlet end of the sieve, is heated up and acts to further purge the hot outlet end. As a result of this procedure the outlet end of the sieve case in the cooling stage is thoroughly stripped of adsorbate. This outlet end, since the feed and cooling streams are run through the contacting zone in the same direction, becomes the outlet end in the adsorption stage. When the feed is passed through the contacting zone, it is readily stripped of susbtantially all benzene, olefins and sulfur in the inlet end of the sieve. Any traces of aromatics, olefins and sulfur remaining are removed in the more thoroughly purged exit end of the sieve. Such a procedure thereby improves cleanup of the feed. The choice of which direction to use during the cooling step depends upon various factors. For instance, when a large amount of purge is available, or if the purge available is not of a high quality, it is desirable to use this modification.

In another modification, the hot sieve case which has just been purged may be cooled by circulating sievate through it in a cooling loop. This procedure serves to remove any traces of benzene which remain after the adsorption step. Effectively, in this modification, the benzene containing hydrocarbon feed is adsorbed in two steps: first, the conventional adsorption step and, secondly, in the cooling step where the fresh sieve case acts as a trimmer.

In still another modification, the separate cooling phase may be eliminated. This may be accomplished by passing feed directly to the sieve case after it has been heated by the purge gas. In this two-stage modification, it is, of course, essential that the cooling front, i.e. the wave of low temperature feed remain in front of the adsorption front. The sieve case is cooled to the proper adsorption temperature very rapidly and its higher initial temperature does not effect the sievate quality significantly.

When isomerate is not available for purge and a purge stream of a low heat capacity is used, it may be desirable to use a 4-stage process. In this modification, the heating and the purging take place in separate sieve cases and external means used to heat and cool. The reason for this modification is that with low heat capacity gases, a very large volume would be needed to heat and cool the sieve cases.

In practicing the present invention, molecular sieves of from about 6 to 15 Angstrom size are preferred. Molecular sieves of this range of pore sizes are highly selective of aromatics and olefinic hydrocarbons over other compounds found in light naphthas. For example, a Linde 13X sieve may be effectively employed. Such a sieve may be prepared by reaction of a sodium silicate having a high ratio of sodium to silica, e.g. sodium metasilicate with a sodium aluminate having a soda-to-alumina ratio of from 1:1 to 3:1, the proportion of sodium silicate solution to sodium aluminate solution being such that the ratio of silica-to-alumina in the final mixture is at least 3:1 and preferably from about 4:1 to about 10:1. Preferably the sodium aluminate solution is added to the sodium metasilicate solution at ambient temperatures while employing rapid and efficient agitation so as to ensure the formation of a precipitate having an essentially uniform composition throughout. The resulting homogeneous paste is heated to about 180° to 215° F. for a period as long as 200 hours or more to ensure that the crystals thereby formed will have the desired pore diameter of from about 10 to 11 Angstroms. After the period of heat soaking, the precipitated sodium aluminosilicate is filtered and water washed and then dried and activated in a calcining zone preferably at a temperature of about 700° to 900° F.

Another adsorbent which may be used in this application is the Linde 10X sieve. This type of sieve is formed from 13X sieve by replacing 50% of the sodium with calcium, and has a pore diameter of from about 8 to 9 Angstroms. The 10X form of sieve is superior to 13X in heat stability. The following table compares the capacities of the two type of sieve for benzene after heating in wet air containing 10% water at 1300° F. for varying periods of time.

TABLE I

| Type of Sieve | Benzene Capacity at Equilibrium, Wt. Percent | |
| --- | --- | --- |
| | 10X | 13X |
| Time, Hrs. at 1,300° F.: | | |
| 0 | 15.5 | 14.7 |
| 3 | 14.5 | 7.3 |
| 65 | 14.0 | 3.0 |

Briefly, the mechanism of the purge is twofold. Firstly, the purge, i.e. isomerate, reduces the partial pressure of the benzene and olefins and thereby provides a driving force for the desorption. Secondly, the isomerate purge is adsorbed, even at elevated temperatures, and displaces the aromatics, olefins and sulfur on the molecular sieve.

Briefly, isomerization is the conversion of normal paraffins to their branch-chained isomers. The following data are typical of the changes in composition occurring upon isomerization.

TABLE II

| Composition, Vol. Percent | Feed | Isomerate |
| --- | --- | --- |
| Isopentane | 12.0 | 19.7 |
| n-Pentane | 16.3 | 4.8 |
| 2-2 dimethyl butane | 2.1 | 20.2 |
| 2-3 dimethyl butane, 2-methyl pentane and cyclopentane | 20.2 | 25.0 |
| 3-methyl pentane | 10.3 | 7.7 |
| n-Hexane | 19.9 | 4.8 |
| Methyl cyclopentane | 12.8 | 2.8 |
| Cyclohexane | 6.4 | 15.0 |
| Benzene | 0.0 | 0.0 |

Of course, the isomerate composition is dependent on the feed used and the operating conditions used, in the particular isomerization reaction.

The isomerate is uniquely suitable as a purge because it is essentially free of aromatics, olefins and sulfur, and effects virtually complete desorption of these components from the molecular sieve. The molecular weight of the isomerate is sufficient to readily displace the benzene at high purging temperatures; yet it is not so high as to retard displacement by the benzene, olefins, and sulfur during the low temperature adsorption stage. This is of great import since these components destroy the aluminum bromide isomerization catalyst.

Where there is a high percentage of benzene in the feed, i.e., on the order of 6%, substantially all of the isomerate i.e. 1.5 w./w. is recycled back to the desorption step. However, where there is only, say, 2% benzene in the feed, it is still sufficient to use 1.5 w./w. of isomerate purge. In accordance with the invention, it is unnecessary, and even undesirable, to separate the isomerate and the benzene since the desorbed benzene improves the octane number of the isomerate gasoline. The avoidance of fractionation eliminates an expensive and time-consuming step from the process.

The particular cycle of the invention has the further advantage of minimizing the external heat needed for successful operation of the process. Using the isomerate stream in the first instant as a coolant for a desorbed molecular sieve, and then for purging, contributes to the overall heat economy of the process.

The following data represent the broad operating limits of the process of the invention:

TABLE III

| | Operating Range | Preferred Range |
| --- | --- | --- |
| Adsorption | | |
| Temperature, ° F. | 70-500 | 200-350 |
| Pressure, p.s.i.g. | 0-100 | 15-60 |
| Flow Rate, w./w./hr. | 0.1-5.0 | 0.5-3.0 |
| Heating and Purge: | | |
| Temperature, ° F. (final) | 500-800 | 550-650 |
| Pressure, p.s.i.g. | 0-100 | 0-45 |
| Flow Rate, w./w./hr. | 0.1-5.0 | 0.5-3.0 |
| Cooling: | | |
| Temperature, ° F. (final) | 70-500 | 200-350 |
| Pressure, p.s.i.g. | 0-100 | 15-60 |
| Flow Rate, w./w./hr. | 0.1-5.0 | 0.5-3.0 |

*Example 1*

The following feed was processed to show the advantages of the invention:

TABLE IV

| Analysis by gas chromatography: | Feedstock comp., Wt. percent |
| --- | --- |
| $nC_4$ | 0.1 |
| $iC_5$ | 11.6 |
| $nC_5$ | 15.1 |
| 2,2-DMB | 1.9 |
| 2-MP, CP, 2,3-DMB | 19.1 |
| 3-MP | 8.9 |
| $nC_6$ | 17.0 |
| 24-DMP, MCP, 2,2-DMP | 11.8 |
| $C_6H_6$ | 5.7 |
| 2,3-DMP, CH, 3,3-DMP | 7.3 |
| 2-MH, 3-MH | 0.5 |
| 3-EP | 0.4 |
| $nC_7$ | 0.1 |
| MCH | 0.3 |
| $C_7H_8$ | 0.1 |

| Inspections: | Feedstock properties |
| --- | --- |
| Gravity, ° API | 76.2 |
| Reid vapor pressure, p.s.i.g. | 9.47 |
| RI at 20° C. | 1.3810 |
| Br. Index (Br. No.×1000)—mg. $Br_2$/100 gm. | 57.0 |
| Sulfur, weight percent | 0.0028 |
| Gum, gm. | 1.0 |
| Color, Saybolt | +28 |
| Aniline pt., ° F. | 135.0 |
| Distillation, ° F. at 760 mm.: | |
| IBP | 105 |
| 5% | 123 |
| 50% | 137 |
| 95% | 161 |
| FBP | 184 |

A sieve process was carried out on the above feed as follows: Adsorption took place at 250° F. This was followed by heating the molecular seive by recycling desorbate and vacuum desorption at 600° F. The sieve was then cooled by recycling sievate and thereby readied for reuse in adsorption. The following data show the operating conditions of this example:

TABLE V

| Adsorption: | |
| --- | --- |
| Pressure, p.s.i.g. | 15 |
| Time, min. | 55 |
| Feed, w./100 w./cycle | 84.6 |
| Bed temp., ° F. (end) | 284 |
| Heating (Desorbate recycle): | |
| Pressure p.s.i.g. | 30 |
| Time, min. | 30 |
| Inlet temp., ° F. | 650 |
| Amount, w./100 w/cycle | 93.0 |
| Bed temp., ° F. (end) | 620 |
| Vacuum: | |
| Refrigeration temp., ° F. | 45 |
| Final pressure, mm. Hg abs. | 100 |
| Time, min. | 30 |
| Bed temp., ° F. (end) | 585 |
| Repressuring: | |
| Final pressure, p.s.i.g. | 25 |
| Time, min. | 7 |
| Amount, w./100 w./cycle | 3.5 |
| Bed temp., ° F. (end) | 585 |
| Cooling (Sievate recycle): | |
| Pressure, p.s.i.g. | 30 |
| Time, min. | 30 |
| Inlet temp., ° F. | 260 |
| Amount, w./100 w./cycle | 93.0 |
| Bed temp., ° F. (end) | 300 |

In accordance with the invention, the vacuum desorption was replaced by a purge step. Purge with an inert gas, N₂, and with sievate were carried on under the following operating conditions:

TABLE VI

Adsorption:
- Feed, w./100 w./cycle _____ 152.3
- Bed temp., ° F. (end) _____ 275
- Pressure, p.s.i.g. _____ 15
- Time, min. _____ 55

Heating (Desorbate recycle):
- Bed temp., ° F. (end) _____ 583
- Pressure, p.s.i.g. _____ 30
- Time, min. _____ 30
- Inlet gas temp., ° F. _____ 660
- Amount recycled, w./100 w./cycle _____ 60

Purge:
- Purge used, w./w./cycle _____ 1.3
- Bed temp., ° F. (end) _____ 642
- Pressure p.s.i.g. _____ 30
- Time, min. _____ 54

Cooling (Sievate recycle):
- Amount recycled, w./100 w./cycle _____ 60
- Bed temp., ° F. (end) _____ 351
- Time, min. _____ 30
- Sievate makeup, w./100 w./cycle _____ 5.8
- Inlet gas temp., ° F. _____ 270

Comparison of the above processes clearly shows the superior benzene-removal obtained by means of the invention.

TABLE VII

| Desorption method (all at 600° F.): | Benzene in sievate, wt. percent |
|---|---|
| Vacuum (100 mm.) | 0.17 |
| Nitrogen purge (300 v./v.) | 0.03 |
| Sievate purge (120 v./v.) | 0.007 |

The effect of the more complete desorption clearly improved the sievate quality, and when sievate purge was used, the benzene content was reduced well below the target level, i.e., 0.02%.

*Example II*

Under the following typical operating conditions, a three-phase process was performed in accordance with the invention. ⅛" pellets of a 13X Linde molecular sieve were used. The feed is substantially the same as that shown in Table IV. Hydrogenated C₅/C₆ Baton Rouge virgin naptha was used as purge.

TABLE VIII

Adsorption:
- Final Bed temp., ° F. _____ 280
- Press., p.s.i.g. _____ 10
- Feed/cycle, w./w. _____ 1.60
- Time, min. _____ 80

Heat and Purge:
- Final bed Temp., ° F. _____ 642
- Press., p.s.i.g. _____ 15
- Purge/cycle, w./w. _____ 1.46
- Time, min. _____ 80

Cooling:
- Final bed. Temp., ° F. _____ 296
- Press., p.s.i.g. _____ 15
- Coolant/cycle, w./w. _____ 1.53
- Time, min. _____ 80

The sievate contained .001% of benzene as compared with 5.5% in the feed. The cycle capacity is 9.3 weight benzene/100 weight sieve. Again it should be noticed that the benzene content of the sievate was reduced well beneath the target level desired.

In actual plant operation, isomerate purge would be used rather than sievate. The effectiveness of desorption would, however, be the same.

The above example is given only as an illustration of the invention and is not intended to define the process.

What is claimed is:

1. An improved process for preparing a naphtha feed for isomerization which comprises passing said naphtha feed through a first contacting zone containing a zeolitic molecular sieve of from about 6 to 15 Angstrom size at a temperature from about 70 to 500° F., adsorbing aromatics, olefins and sulfur from said feed in said first contacting zone, withdrawing from said first contacting zone a naphtha essentially free of aromatics, olefins and sulfur passing aromatic, olefin and sulfur-free feed to an isomerization reactor; cyclically interrupting the flow of said feed into said first contacting zone; heating isomerate by passing said isomerate through a second contacting zone containing a previously heated and desorbed molecular sieve, heating and purging said first molecular sieve by passing said hot isomerate at a temperature of from about 500 to 800° F. through said first contacting zone, thereby desorbing the adsorbed aromatics, olefins and sulfur; withdrawing said isomerate vapors, desorbed aromatics, olefins, and sulfur from said contacting zone; and cooling said molecular sieve to about 70 to 500° F. by passing cool isomerate vapors from said isomerization reactor through said first contacting zone, thereby preparing said molecular sieve for another adsorption step.

2. The process of claim 1 wherein said molecular sieve is of the formula $0.9 \pm 0.2 M_{\frac{2}{n}}O : Al_2O_3 : 2.5 \pm 0.5 SiO_2$ where M is a metal ion and $n$ is its valance.

3. The process of claim 2 wherein said M is a sodium ion.

4. The process of claim 3 wherein at least part of the sodium ions are replaced by calcium ions.

5. In the process of claim 1 wherein said naphtha feed is in the vapor phase in said first contacting zone.

6. In the process of claim 1 wherein said naphtha feed is in the liquid phase in said first contacting zone.

7. An improved process for adsorption and desorption of aromatics, olefins, and sulfur which comprises passing a naphtha feed containing aromatics, olefins, and sulfur through a first contacting zone containing a zeolitic molecular sieve of from about 6–15 A. size, adsorbing said aromatics, olefins, and sulfur from said feed in said first contacting zone, withdrawing from said first contacting zone a naphtha essentially free of aromatics, olefins, and sulfur; cyclically interrupting the flow of said feed into said contacting zone; heating hydrocarbon vapors free of aromatics, olefins, and sulfur by passing said hydrocarbon vapors through a second contacting zone containing a previously heated and desorbed molecular sieve, heating and purging said molecular sieve in said first contacting zone by passing said hydrocarbon vapor through said contacting zone, thereby desorbing the adsorbed aromatics, olefins, and sulfur, withdrawing said hydrocarbon vapors, desorbed aromatics, olefins, and sulfur from said contacting zone and cool said molecular sieve from about 70 to 500° F. by passing cool hydrocarbon vapors through said contacting zone in the same direction as in said desorption phase, thereby preparing said molecular sieve zone for another adsorption step.

8. A process as in claim 7 wherein the naphtha feed is passed through said contacting zone in the same direction as the hydrocarbon gas in desorbing.

9. In the process of claim 7 wherein said adsorbing is carried out at a temperature from about 70 to 500° F. and said purging is carried out at a temperature from about 500 to 800° F.

10. In the process of claim 1 wherein the adsorption is carried out at a temperature from about 200 to 350° F., said purging is carried out at a temperature between 550 and 650° F., and said cooling is carried out to a temperature from about 200 to 350° F.

11. An improved process for preparing a high octane gasoline which comprises passing a naphtha feed through a first contacting zone containing a zeolitic molecular sieve of from about 6–15 A. size at a temperature from about 70 to 500° F., adsorbing aromatics, olefins and sulfur from said feed in said first contacting zone, withdrawing from said first contacting zone a naphtha essentially free of said aromatics, olefins and sulfur, passing said aromatic, olefin and sulfur-free naphtha to an isomerization reactor, isomerizing said aromatic, olefin and sulfur-free naphtha in said isomerization reactor, passing said isomerized product in a second contacting zone containing a molecular sieve at a temperature from about 500 to 800° F., thereby heating said isomerized product and simultaneously cooling the molecular sieve in said second contacting zone, passing said isomerized product to a third contacting zone containing a molecular sieve substantially saturated with aromatics, olefins, and sulfur, purging said aromatics, olefins, and sulfur with said product and withdrawing from said third contacting zone a high octane gasoline.

12. The process of claim 11 wherein said naphtha feed is passed through the second contacting zone after said cooling.

13. An improved process for preparing a high octane gasoline which comprises passing a naphtha feed through a first contacting zone containing a zeolite molecular sieve of from about 6–15 A. size at a temperature from about 70 to 500° F., adsorbing aromatics, olefins and sulfur from said feed in said first contacting zone, withdrawing from said first contacting zone a naphtha essentially free of said olefins and sulfur, and containing less than 0.02% aromatics, passing said aromatics, olefin and sulfur-free naphtha to an $AlBr_3$ isomerization reactor, isomerizing said aromatic, olefin and sulfur-free naphtha in said isomerization reactor, passing said isomerized product to a second contacting zone containing a molecular sieve at a temperature from about 500 to 800° F., thereby heating said isomerized product and simultaneously cooling the molecular sieve in said second contacting zone, passing said isomerized product to a third contacting zone containing a molecular sieve substantially saturated with aromatics, olefins, and sulfur, purging said aromatics, olefins, and sulfur with said product and withdrawing from said third contacting zone a high octane gasoline.

14. An improved process for preparing a high octane gasoline which comprises passing a naphtha feed through a contacting zone containing a zeolite molecular sieve of from about 6–15 A. size at a temperature from about 70 to 500° F., adsorbing aromatics, olefins and sulfur from said feed in said contacting zone, withdrawing from said contacting zone a naphtha essentially free of said olefins and sulfur, and containing less than 0.02% aromatics, passing said aromatics, olefin and sulfur-free naphtha to an $AlBr_3$ isomerization reactor, isomerizing said aromatics, olefin and sulfur-free naphtha in said isomerization reactor, passing said isomerized product to a contacting zone containing an desorbed molecular sieve at a temperature of from about 500 to 800° F., thereby heating said isomerized product and simultaneously cooling the molecular sieve in said contacting zone, passing said heated isomerized product to a contacting zone containing a molecular sieve substantially saturated with aromatics, olefins, and sulfur, desorbing said aromatics, olefins, and sulfur from said sieve with said heated isomerized product and withdrawing from said contacting zone a high octane gasoline containing said desorbed aromatics and said isomerized product.

References Cited in the file of this patent

UNITED STATES PATENTS

| | | |
|---|---|---|
| 2,415,315 | Walter et al. | Feb. 4, 1947 |
| 2,493,499 | Perry | Jan. 3, 1950 |
| 2,818,455 | Ballard et al. | Dec. 31, 1957 |
| 2,882,244 | Milton | Apr. 14, 1959 |
| 2,937,215 | Bleich et al. | May 17, 1960 |